(12) United States Patent
Wang et al.

(10) Patent No.: US 8,160,412 B2
(45) Date of Patent: Apr. 17, 2012

(54) MICROHOLE-STRUCTURED LONG PERIOD FIBER GRATING

(75) Inventors: Dongning Wang, Hong Kong (HK); Ying Wang, Hong Kong (HK); Minwei Yang, Hong Kong (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 241 days.

(21) Appl. No.: 12/633,782

(22) Filed: Dec. 8, 2009

(65) Prior Publication Data

US 2011/0135245 A1    Jun. 9, 2011

(51) Int. Cl.
*G02B 6/34* (2006.01)
(52) U.S. Cl. .......................................................... 385/37
(58) Field of Classification Search .................. None
See application file for complete search history.

(56) References Cited

U.S. PATENT DOCUMENTS

| | | | | |
|---|---|---|---|---|
| 6,075,915 | A * | 6/2000 | Koops et al. | 385/125 |
| 7,033,519 | B2 * | 4/2006 | Taylor et al. | 216/87 |
| 7,376,307 | B2 * | 5/2008 | Singh et al. | 385/37 |
| 7,438,824 | B2 * | 10/2008 | Taylor et al. | 216/62 |
| 2001/0021293 | A1 * | 9/2001 | Kouta et al. | 385/37 |
| 2006/0147170 | A1 * | 7/2006 | Ashkenasi et al. | 385/132 |
| 2006/0215959 | A1 * | 9/2006 | McCarthy et al. | 385/37 |
| 2007/0091977 | A1 * | 4/2007 | Sohn et al. | 372/109 |
| 2007/0230861 | A1 * | 10/2007 | Khrushchev et al. | 385/13 |

FOREIGN PATENT DOCUMENTS

GB        2407055 A  *  4/2005

OTHER PUBLICATIONS

Stephen W James and Ralph P Tatam "Optical fibre long-period grating sensors:characteristics and application" Meas. Sci. Technol. 14 (2003) R49-R61.
Vikram Bhatia and Ashish M. Vengsarkar "Optical fiber long-period grating sensors" Optics Letters/vol. 21, No. 9/ May 1, 1996.
K.P. Chen, P.R. Herman, R. Tam and J. Zhang "Rapid long-period grating formation in hydrogen-loaded fibre with 157 nm F2,—laser radiation" Electronics Letters Nov. 23, 2000 vol. 36 No. 24.
Yi-Ping Wang, D.N. Wang, Wei Jin, Yun-Jiang Rao, Gang-Ding Peng "Asymmetric long period fiber gratings fabricated by use of $CO_2$ laser to carve periodic grooves on the optical fiber" Applied Physics Letters 89, 151105 (2006).
P. Palai, M.N. Satyanarayan, Mini Das, K. Thyagarajan, B.P. Pal "Characterization and simulation of long period gratings fabricated using electric discharge" Optics Communications 193 (2001) 181-185.

(Continued)

*Primary Examiner* — Mike Stahl
(74) *Attorney, Agent, or Firm* — The Hong Kong Polytechnic University

(57) ABSTRACT

An optical fiber with long period fiber gratings includes an optical fiber axis, a core region extending along the fiber axis, the core region having a core refractive index, a cladding region surrounding the core region, the cladding having a cladding refractive index, and a plurality of microholes perpendicular to the fiber axis with a portion of the core region removed, the plurality of microholes are spaced apart by a grating period.

17 Claims, 8 Drawing Sheets

OTHER PUBLICATIONS

Francis Hindle, Eric Fertein, Christophe Przygodzke, Florian Durr, Laurent Paccou, Robin Bocquet, Pierre Niay, Hans Georg Limberger and Marc Douay "Inscription of Long-Period Gratings in Pure Silica and Germano—Silicate Fiber Cores by Femtosecond Laser Irradiation" IEEE Photonics Technology Letters, vol. 16, No. 8, Aug. 2004.

Stephen J. Mihailov, Christopher W. Smelser, Dangrobnic, Robert B. Walker, Ping Lu, Huimin Ding and James Unruh "Bragg Gratings Written in All-SiO2 and Ge-Doped Core Fibers With 800-nm Femtosecond Radiation and a Phase Mask" Journal of Lightwave Technology, vol. 22 No. 1 Jan. 2004.

Andriu Marcinkevicius, Saulius Juodkazis, Mitsuru Watanabe, Masafumi Miwa, Shigeki Matsuo and Hiroaki Misawa "Femtosecond laser-assisted three-dimensional microfabrication in silica" Optics Letters vol. 26, No. 5/ Mar. 1, 2001.

E.N. Glezer and E. Mazur "Ultrafast-laser driven micro-explosions in transparent materials" Appl. Phys. Lett. 71(7), Aug. 18, 1997.

Y. Lai, K. K Zhou, L. Zhang and I. Bennion "Microchannels in conventional single-mode fibers" Optics Letters/ vol. 31, No. 17/ Sep. 1, 2006.

Yang Wang, D.N. Wang, Minwei Yang, Wei Hong and Peixiang Lu "Refractive index sensor based on a microhole in single-mode fiber created by the use of femtosecond laser micromachining" Optics Letters/vol. 34 No. 21/Nov. 1, 2009.

Xuewen Shu, Lin Zhang, Ian Bennion "Sensitivity Characteristics of Long-Period Fiber Gratings" Journal of Lightwave Technology, vol. 20, No. 2, Feb. 2002.

Yiping Wang, Wei Jin, Jian Lu, Haifeng Xuan, Hoi Lut Ho, Limin Xiao and Dongning Wang "Long period gratings in air-core photonic bandgap fibers" Optics Express/vol. 16, No. 4/Feb. 18, 2008.

Long Jin, Zhi Wang, Yange Liu, Guiyun Kai, Xiaoyi Dng "Ultraviolet-inscribed long period gratings in all-solid photonic bandgap fibers" Optics Express/vol. 16, No. 25/Dec. 8, 2008.

F. Luan, A.K. George, T.D. Hedley, G.J. Pearce, D.M. Bird, J.C. Knight and P.ST. J. Russell "All-solid photonic bandgap fiber" Optics Letters/vol. 29, No. 20/ Oct. 15 2004.

A. Betourne, G. Bouwmans, Y. Quiquempois, M. Perrin and M. Douay "Improvements of solid-core photonic bandgap fibers by means of interstitial air holes" Optics Letters /vol. 32, No. 12/ Jun. 15, 2007.

Yuhua Li, D.N. Wang and Long Jin "Single-mode grating reflection in all-solid photonic bandgap fibers inscribed by use of femtosecond laser pulse irradiation through a phase mask" Optics Letters/vol. 34, No. 8/ Apr. 15, 2009.

Catalin Florea and Kim A. Winick "Fabrication and Characterization of Photonic Devices Directly Written in Glass Using Femtosecond Laser Pulses" Journal of Lightwave Technology, vol. 21, No. 1, Jan. 2003.

M.D. Perry, B.C. Stuart, P.S. Banks, M.D. Feit, V. Yanovsky and A.M. Rubenchik "Ultrashort-pulse laser machining of dielectric materials" Journal of Applied Physics, vol. 85, No. 9, May 1, 1999.

Y. Li et al. "Three-dimensional hole drilling of silica glass from the rear surface with femtosecond laser pulses" Optics Letters/vol. 26, No. 23/ Dec. 1, 2001.

Georges Humbert and Abdelrafik Malki "Electric-arc-induced gratings in non-hydrogenated fibres: fabrication and high-temperature characterizations" J. Opt. A: Pure Appl. Opt. 4 (2002) 194-198.

Yuki Kondo, Kentaro Nouchi, Tsuneo Mitsuyu, Masaru Watanabe, Peter G. Kazansky and Kazuyuki Hirao "Fabrication of long-period fiber gratings by focused irradiation of infrared femtosecond laser pulses" Optics Letters/vol. 24, No. 10/May 15, 1999.

Turan Erdogan "Fiber Grating Spectra" Journal of Lightwave Technology, vol. 15, No. 8, Aug. 1997.

Alexey I. Kalachev, David N. Nikogosyan and Gilberto Brambilla "Long-Period Fiber Grating Fabrication by High-Intensity Femtosecond Pulses at 211 nm" Journal of Lightwave Technology, vol. 23, No. 8, Aug. 2005.

Ashish M. Vengsarkar, Paul J. Lemaire, Justin B. Judkins, Vikram Bhatia, Turan Erdogan and John E. Sipe "Long-Period Fiber Gratings as Band-Rejection Filters" Journal of Lightwave Technology, vol. 14, No. 1, Jan. 1996.

D.D. Davis, T K Gaylord, E.N. Glytsis, S.G. Kosinski, S.C. Mettler and A.M. Vengsarkar "Long-period fibre grating fabrication with focused CO2 laser pulses" Electronics Letters vol. 34, No. 3, Feb. 5, 1998.

Yun-Jiang Rao, Yi-Ping Wang, Zeng-Ling Ran and Tao Zhu "Novel Fiber-Optic Sensors Based on Long-Period Fiber Gratings Written by High-Frequency CO2 Laser Pulses" Journal of Lightwave Technology, vol. 21, No. 5, May 2003.

S. Savin, M.J.F. Digonnet, G.S. Kino and H.J. Shaw "Tunable mechanically induced long-period fiber gratings" Optics Letters/vol. 25, No. 10/ May 15, 2000.

* cited by examiner

MICROHOLE-STRUCTURED LONG PERIOD FIBER GRATING

BACKGROUND OF THE INVENTION

1. Field of the Invention

The present invention relates to optical fiber with long period fiber gratings, more particularly to an optical fiber with microhole-structured long period fiber gratings.

2. Description of the Related Art

Long period fiber grating (LPFG) is an optical device that exhibits a periodic refractive index (RI) change in the optical fiber or a periodic geometry structure along the fiber length. LPFG typically has fiber gratings period of approximately from one to a few hundreds µm. Unlike short-period gratings such as fiber Bragg gratings (FBG), long-period gratings do not backscatter the resonance wavelength. LPFG can couple light from fundamental guided core mode to forward propagating cladding mode at the resonant wavelengths satisfying the phase matching conditions. The periodic change in RI or geometric structure in the fiber can be realized by various means such as ultraviolet (UV) light illumination, $CO_2$ laser irradiation, electric-arc discharge, mechanical pressure and femtosecond laser pulse irradiation.

Vengsarkar, et al., "Long-period fiber gratings as band-rejection filters", J. Lightwave Technol., 14, 58-65 (1996), discloses an ultraviolet (UV) light inscription method for inscribing long period gratings. In particular, Hydrogen loaded single mode fiber is exposed to a KrF laser (248 nm) through an amplitude mask made of chrome-plated silica. The transmission spectrum of the grating is monitored by a broadband source and an optical spectrum analyzer during the grating is being written. The mechanism of this kind of fabrication is to utilize the photosensitivity of the germanosilicate (Ge) fiber to induce a periodical refractive index change in the fiber core. A drawback of this method is that it requires an amplitude mask, which cannot change the period once it is made.

Savin et al., "Tunable mechanically induced long-period fiber gratings", Opt. Lett., 25, 710-712 (2000) discloses a mechanical bending method for inscribing long period gratings. In Savin et al., a fiber is inserted between a V-grooved plate and a flat plate. Through increasing pressure on the grooved plate, the fiber is periodically micro-bent and thus results in a periodical refractive index change in the fiber because of the photo-elastic effect. The fiber used does not need to be photosensitive and the grating period can be changed by altering the period of pressure added. This kind of method has a certain amount of polarization dependence. The long term stability and the complicated device component are the disadvantages for this inscription method.

Humbert et al., "Electric-arc-induced gratings in non-hydrogenated fibres: fabrication and high-temperature characterizations", J. Optics A: Pure and Applied Optics., 4, 194-198 (2002), discloses an electrical arc discharge method that uses a splicer to produce a momentary high temperature, which is usually higher than that of the fictive temperature of the glass. Through the mechanism of thermal shock effect and the residual stress relaxation during the temporary high temperature, the refractive index of the glass fiber will decrease locally. The grating period can be controlled by a computer controlled motor. Moreover, this method does not require the fiber to be photosensitive.

Rao et al., "Novel fiber-optic sensors based on long-period fiber gratings written by high-frequency $CO_2$ laser pulses", J. Lightwave Technol., 21, 1320-1327 (2003) discloses a high frequency (~kHz) $CO_2$ laser scanning method for inscribing long period gratings. Compared with $CO_2$ laser with low frequency (~Hz), this method possesses advantages of small laser focus spot, high heating efficiency and therefore a higher inscription efficiency. The major principle is residual stress relaxation, which is the same as that of electric arc discharge. Besides, periodically deformation and material densification may also change the refractive index of the fiber. The period of the grating can be controlled by a computer. This method also is not limited to photosensitive fiber.

Kondo et al., "Fabrication of long-period fiber gratings by focused irradiation of infrared femtosecond laser pulses", Opt. Lett., 24, 646-648 (1999), and Kalachev et al., "Long-Period Fiber Grating Fabrication by High-Intensity Femtosecond Pulses at 211 nm", J. Lightwave Technol., 23, 2568-2578 (2005) disclose a focused irradiation of femtosecond laser pulse method for inscribing long period gratings. Femtosecond laser pulses with wavelength of 800 nm and 211 nm have been used to fabricate LPFGs. The mechanism of this method is to induce the refractive index change mainly in the fiber core through a process of multi-photon absorption. LPFGs made by this method have an enhanced high temperature stability compared with that of UV irradiation.

The strong light intensity over ultra-short pulse duration together with good spatial resolution also makes the femtosecond laser a powerful tool for high precision ablation of glass materials, as disclosed in Marcinkevicius, et al., "Femtosecond laser-assisted three-dimensional machofabraction in silica". The attractiveness of femtosecond laser pulse ablation also lies in the fact that the materials can be removed in a fast and clean manners, with negligible heat affected zones, thus avoiding any significant damages to the underlying substrate. Such clean and high precision femtosecond laser pulse ablation is well suited for micromachining applications in optical fibers.

SUMMARY OF THE INVENTION

According to an aspect of the present invention, there is provided an optical fiber with long period fiber gratings includes an optical fiber axis, a core region extending along the fiber axis, the core region having a core refractive index, a cladding region surrounding the core region, the cladding having a cladding refractive index, and a plurality of microholes perpendicular to the fiber axis with a portion of the core region removed, the plurality of microholes are spaced apart by a grating period.

According to another aspect of the present invention, there is provided a method of fabricating an optical fiber with long period fiber gratings, the method includes securing an optical fiber, the optical fiber having a core region extending along a fiber axis of the optical fiber, the core region having a core refractive index, and having a cladding region surrounding the core region, the cladding having a cladding refractive index, and drilling a plurality of microholes perpendicular to the fiber axis with a portion of the core region removed, the plurality of microholes are spaced apart by a grating period.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The femtosecond laser pulse irradiation is a flexible method that allows inscription of LPFGs in both fiber core and fiber cladding without limiting to photosensitive fiber. The present invention is also not limited to any type of fiber, for example, the fiber may be a single mode fiber (SMF) or micro-structured fiber such as photonic-crystal fiber (PCF) and photonic-bandgap fiber (PBGF). Moreover, because of the high optical intensity across a small spatial region and fast interaction time, a highly localized RI modulation can be produced, which permits the fabrication of strong and high spectral quality gratings.

Single Mode Fiber

According to one embodiment, the present invention relates to a LPFG single mode fiber which consists of a series of microholes perpendicularly and periodically positioned along the fiber axis. Such an LPFG device exhibits a large RI modulation, and thus, the number of grating periods can be significantly reduced, before saturation. According to one embodiment, the number of fiber gratings is 15 or less. Moreover, the microhole-structured LPFGs exhibit relatively high sensitivity when used as a RI sensor, owing to the fact that both the fundamental core mode and the cladding mode can be directly and simultaneously interact with the surrounding medium. The average sensitivity obtained is much higher than the typical value of a conventional LPFG in SMF. Furthermore, the microhole-structured LPFGs can be used for temperature sensing, especially for high temperature sensing of 1000° C. or higher, owing to the permanent physical structural change which provides excellent thermal stability at elevated temperatures.

According to one embodiment of the present invention, femtosecond laser pulse ($\lambda$=800 nm) of 120 fs at a repetition rate of 1 kHz is focused onto an optical fiber such as Corning's SMF-28® by a 10× objective lens with a numerical aperture (NA) value of 0.25, and a working distance of 7 mm. The on-target pulse energy can be maintained at approximately 15 µJ. The fiber core diameter was approximately 8.2 µm, with nominal effective index of 1.4682 (@1550 nm). The fiber is mounted and secured on a three dimensional translation stage, which is carefully adjusted so that the fiber is parallel to the X-axis and the laser focus was located on the central fiber axis. The fiber is then shifted by 6 µm along the Y-axis and this position is set as the jumping-off point of the grating. The fiber is then connected with a broadband light source with a span of 400 nm (from 1250 to 1650 nm) and an optical spectrum analyzer (OSA) with a resolution of 0.1 nm to monitor the transmission spectra in real-time. The microhole is drilled by irradiating the focused femtosecond laser beam for about 20 seconds. After one microhole was created, the fiber can be shifted by a grating period along the fiber length (X-axis), and the process continues until an LPFG with appropriate resonance dip is obtained.

Figure 1A:
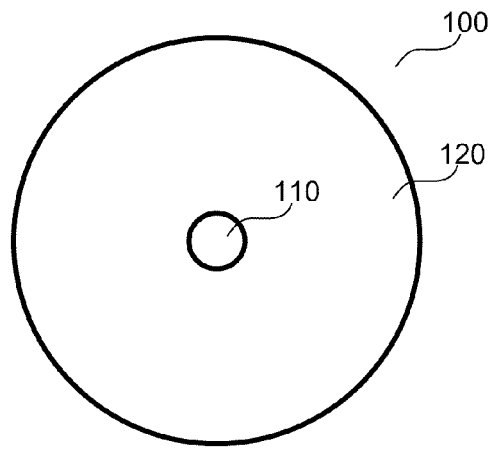
FIG. 1A shows in enlarged scale of a cross-sectional view of a Single Mode Fiber prior to microhole fabrication.
Figure 1B:
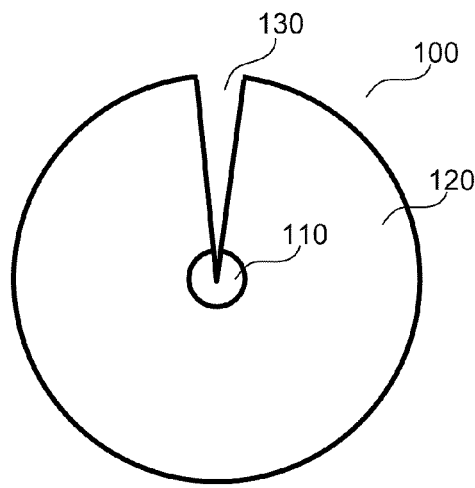
FIG. 1B illustrates an enlarged scale of a cross-sectional view of a microhole-structured LPFG Single Mode Fiber.

FIG. 1A shows in enlarged scale of a cross-sectional view of a SMF 100 prior to microhole fabrication in which the SMF 100 includes a core region 110 and a cladding region 120. Core region 110 has a core RI and cladding region 120 has a cladding RI. Generally, the core RI is higher than the cladding RI. FIG. 1B illustrates an enlarged scale of a cross-sectional view of a microhole-structured LPFG SMF 100.

By using ultra-short pulse irradiation such as femtosecond pulse irradiation as discussed above, various types of microholes can be created on the optical fiber 100. FIG. 1B shows in enlarged scale of a cross-sectional view of a LPFG fiber according to one embodiment of the present invention. As shown in FIG. 1B, a microhole 130 is drilled from the cladding region 120 to the core region 110 and as a result, a portion of the core region 110 is removed. While FIG. 1B illustrates a cone shaped microhole 130, microhole 130 is not limited to any particular structure. For instance, microhole 130 may have a rectangular or a curved bottom structure. According to another embodiment of the present invention (FIG. 1C), a microhole 140 is a micro-channel extends through core 110 and cladding 120 with a portion of the core 110 removed. The present invention does not limit the position of microhole 130 or microhole 140. As such, the plurality of microholes realizes the function of fiber gratings that periodically modify refractive index of the core of an optical waveguide.

According to one embodiment of the present invention, the microhole's diameter at the fiber core and cladding interface is approximately 6.5 µm. In particular, part of the fiber core (about 1.4 µm along the radial direction) was removed by the creation of the microhole. The mode profiles of the near field of the core mode and the high-order cladding mode at the resonance wavelength of the LPFG are at 1600 and 1517.4 nm, respectively, by the use of a tunable laser (from 1494 to 1640 nm).

Figure 1C:
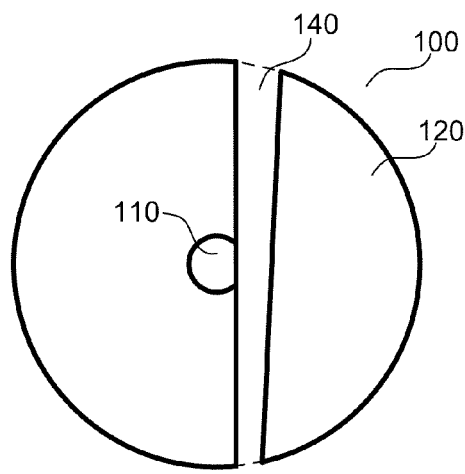
FIG. 1C illustrates a microhole that extends through the core and cladding with a portion of the core removed.
Figure 2A:
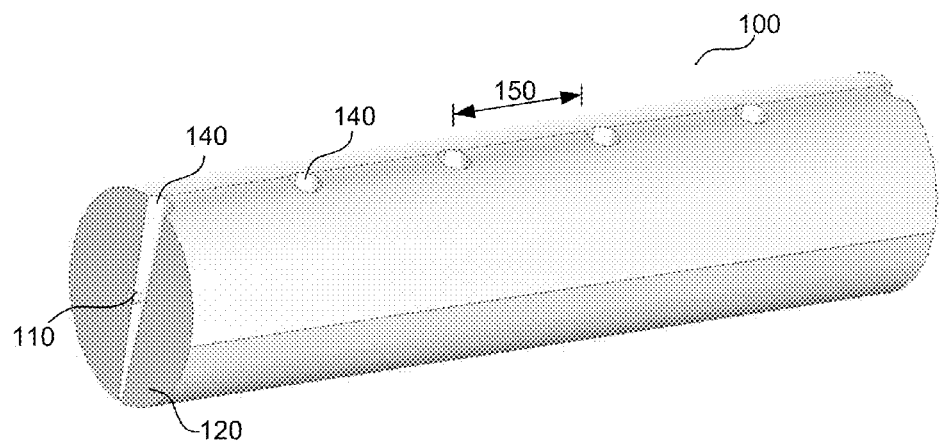
FIG. 2A shows an external side view of a section of a microhole-structured LPFG fiber of FIG. 1C.
Figure 2B:
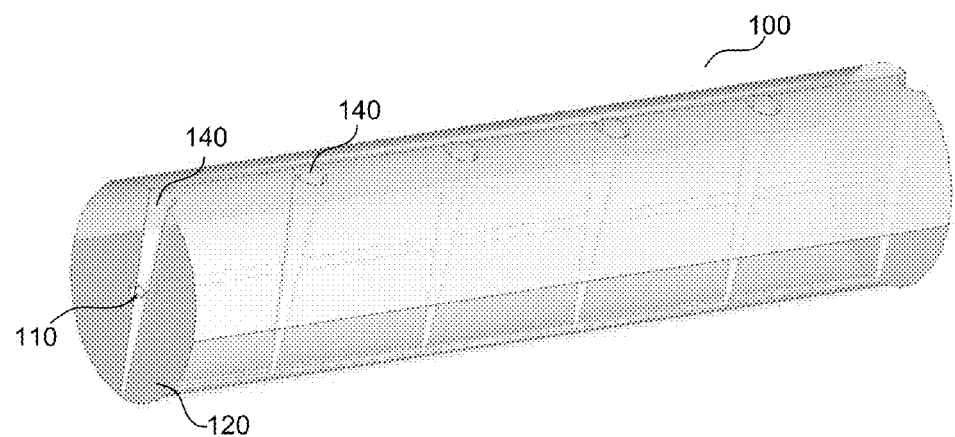
FIG. 2B shows a transparent view of a section of a microhole-structured LPFG fiber of FIG. 1C.

FIGS. 2A and 2B show a side view of a section of a microhole-structured LPFG fiber of FIG. 1C. As shown in FIG. 2A, a plurality of microholes is perpendicularly drilled toward the fiber axis in which the microholes are spaced part by a grating period 150. FIG. 2B shows a transparent view of FIG. 2A illustrating the internal structure of a microhole-structured LPFG fiber.

By periodically creating microholes along the fiber axis, both the core 110 and the cladding 120 have created a structural modulation. This structural modulation results in a large refractive index change Δn similar to that induced by other conventional fiber grating inscription methods. In addition, through a strong cross section deformation of the fiber, the mode field profile of the core mode $e_i$ and the corresponding cladding mode $e_j$ will also change. Since no light energy can stably exist in the air gap of the microhole, no propagation can exist.

According to the coupled mode theory, the transmission of an LPFG can be expressed by the following expressions [1]:

$$T = \cos^2(\kappa L) \quad [1]$$

Where T is the normalized transmission, L is the grating length and κ is the cross coupling coefficient between the fundamental core mode and the cladding mode $$\kappa = \frac{\pi}{\lambda} \int \int_\infty \Delta n(x,y) e_i e_j^* dx dy \quad [2]$$

Therefore, for the maximum coupling condition $\kappa L = \pi/2$, the grating length L can be reduced if the κ factor is large.

Figure 3A:
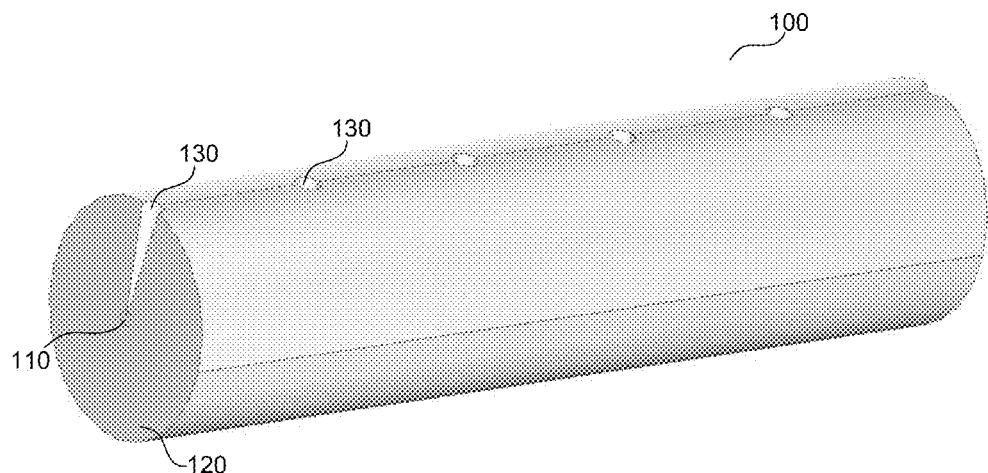
FIG. 3A shows an external side view of a section of a microhole-structured LPFG fiber of FIG. 1B.
Figure 3B:
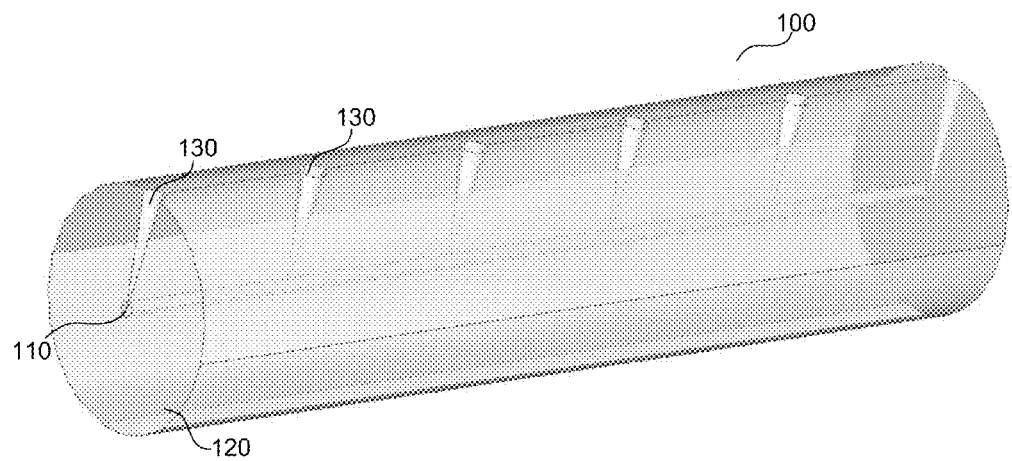
FIG. 3B shows a transparent side view of a section of a microhole-structured LPFG fiber of FIG. 1B.

FIGS. 3A and 3B show a side view of a section of a microhole-structured LPFG fiber of FIG. 1B. As shown in FIG. 3A, a plurality of microholes is periodically drilled with a good repeatability. FIG. 3B shows a transparent view of FIG. 2A illustrating the internal configuration of a microhole-structured LPFG fiber.

Figure 5:
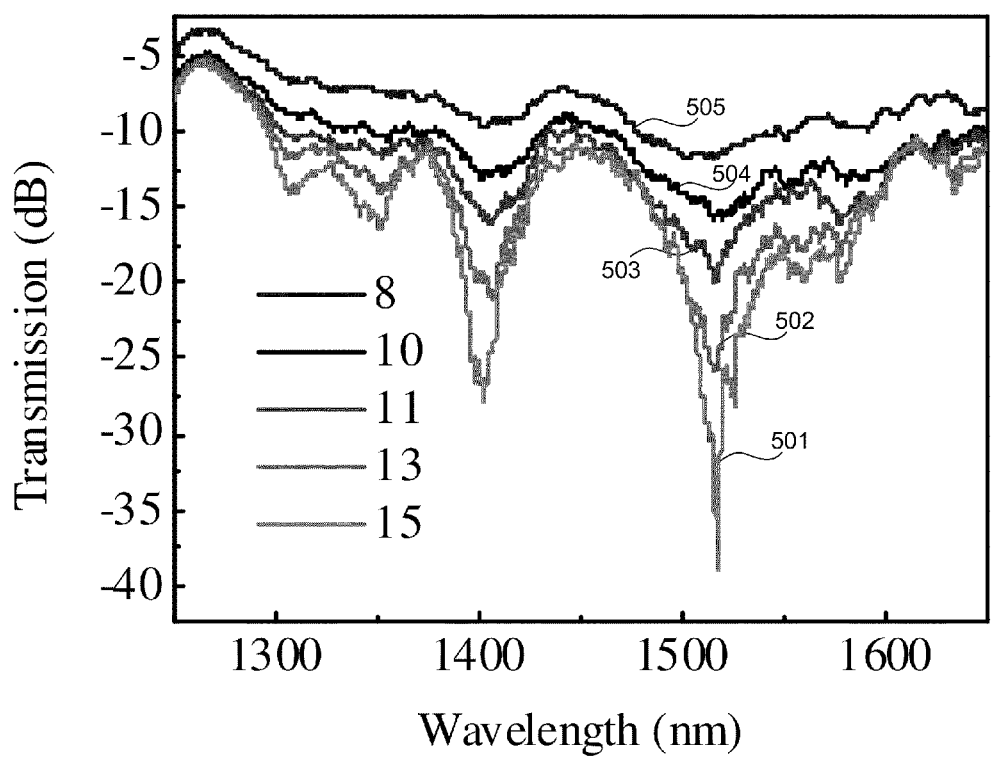
FIG. 5 is a graph illustrating transmission per wavelength for various number of fiber grating periods of the microhole-structured LPFG in SMF in connection with FIG. 1C.

FIG. 5 is a graph illustrating transmission per wavelength for various number of fiber grating periods of the microhole-structured LPFG SMF in connection with FIG. 1C, with a grating period of 450 μm. Lines 501, 502, 503, 504 and 505 represent 15 grating periods, 13 grating periods, 11 grating periods, 10 grating periods, and 8 grating periods, respectively. The transmission loss increases monotonically from one to seven grating periods. The resonance peaks appear at around 1404 and 1517 nm respectively, after the eighth grating period is produced. The depth of the resonance peak around 1517 nm becomes the deepest when 15 grating periods are created, which is over 20 dB with an insertion loss of about 15 dB. The depth would dramatically decay if the number of grating periods were further increased. The resonance peak near 1404 nm is created due to the coupling of the fundamental core mode to another lower order cladding mode.

Figure 6A:
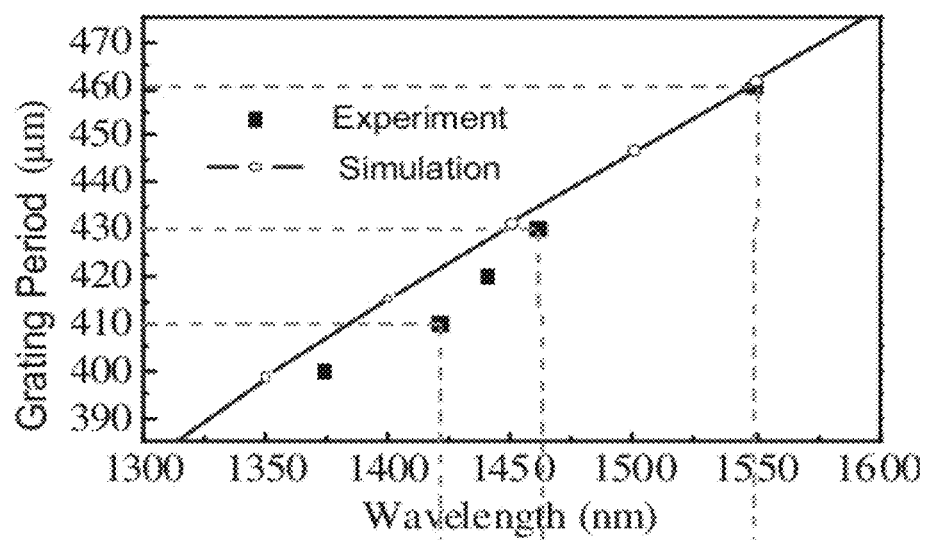
FIG. 6A shows the calculated phase-matching curve for the coupling between the fundamental core mode and the cladding mode of the microhole-structured LPFG with an FEM (finite element method) model established according to FIG. 1C.
Figure 6B:
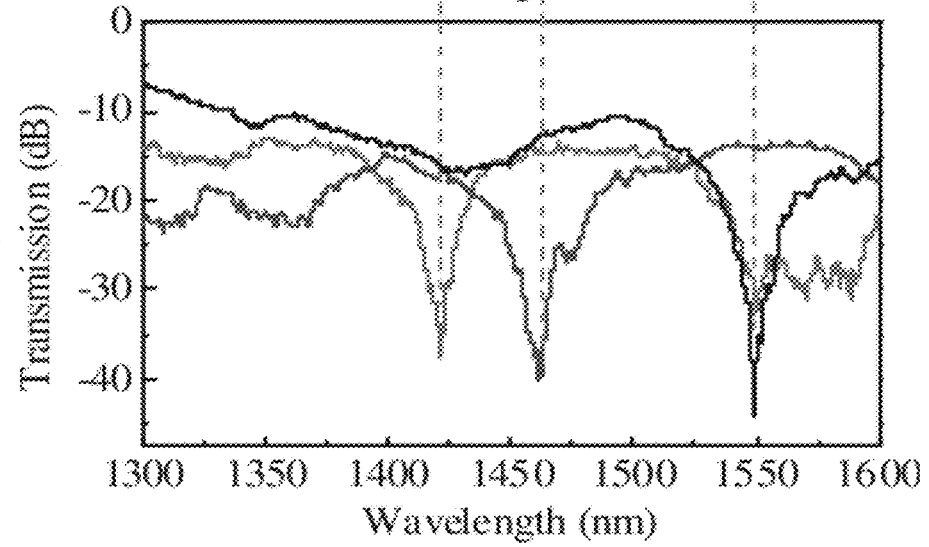
FIG. 6B illustrates the transmission spectra of the LPFGs with various grating periods.

FIG. 6A shows the calculated phase-matching curve for the coupling between the fundamental core mode $LP_{01}$ and the cladding mode $LP_{16}$ of the microhole-structured LPFG with an FEM (finite element method) model established according to FIG. 1B. A few LPFGs with grating periods from 400 to 460 μm shows that the resonant wavelengths are in good agreement with the results obtained from the phase-matching curve for the $LP_{01}$ and $LP_{16}$ modes. FIG. 6B illustrates the transmission spectra of the LPFGs with grating period of 410, 430 and 460 μm, respectively. The visibilities of the resonance peaks are all over 20 dB.

To illustrate the response of the LPFG to the surrounding RI, an LPFG with the grating period of 430 μm is immersed into a series of RI liquid samples (from Cargille Laboratories). The RI of the liquids used was in the range between 1.31 and 1.40 (@589.3 nm). Each time after the sample was measured, the LPFG was rinsed with methanol carefully until the original spectrum (namely, the original spectrum in air) could be restored and no residue liquid is left inside the micro-hole.

Figure 7:
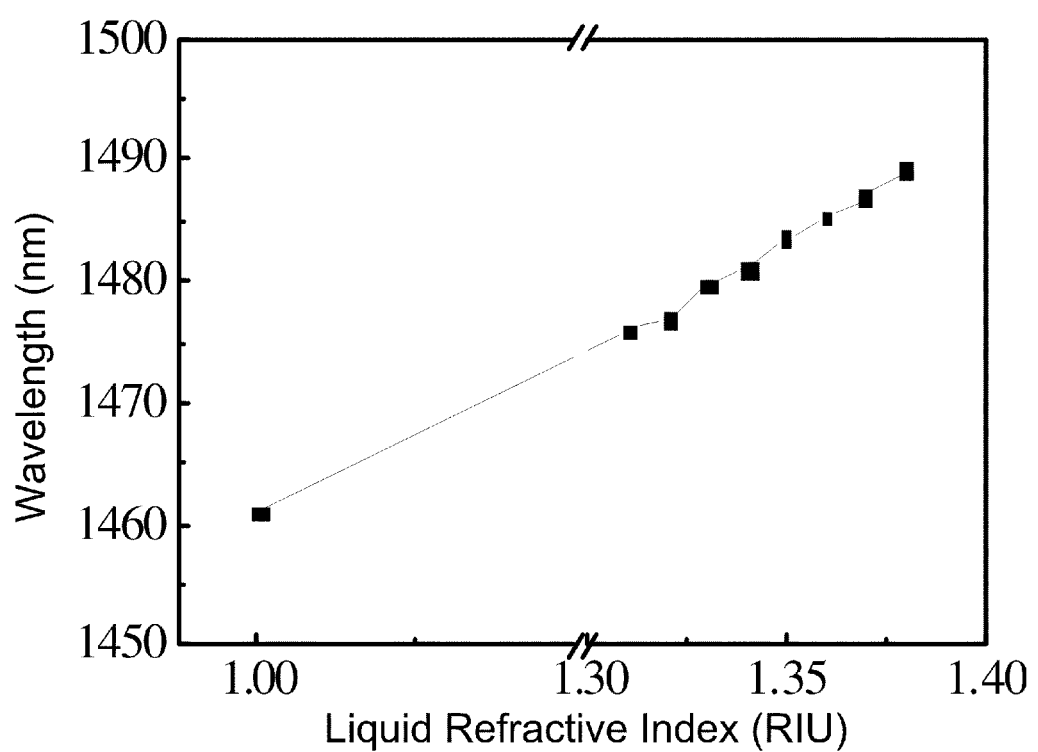
FIG. 7 is a transmission spectra graph of the microhole-structured LPFG in different RI liquids.

The transmission spectra of the LPFG in different RI liquids are recorded and the resonance wavelengths are plotted in FIG. 7. The average RI sensitivity obtained is approximately 190 nm/RIU between 1.31 and 1.38. It can be note that the data recorded in FIG. 7 are in the range from 1.31 to 1.38, as the visibility of the resonance peak decays with the increase of RI and becomes non-resolvable at 1.39 RIU. With the increase of the surrounding RI value, the resonant wavelength of the LPFG experiences red shift (a shift toward longer wavelength), being different from the blue shift (a shift toward shorter wavelength) characteristics of the traditional LPFG fabricated by UV light or $CO_2$ laser in SMF. The "red shift" could be explained by use of the phase-matching curve (as shown in FIG. 6A) of the microhole-structured LPFG fiber. The waveguide dispersion is defined as $$\gamma = \frac{d\lambda_{res}}{d\Lambda} \Big/ \Delta n^{eff},$$

where $\lambda_{res}$ is the resonant wavelength, Λ is the grating period and $\Delta n^{eff}$ is the effective index difference between the fundamental core mode and the cladding mode. In general, the $$\frac{d\lambda_{res}}{d\Lambda}$$

term is negative for UV or $CO_2$ laser written LPFG in SMF, however, this term becomes positive for the microhole-structured LPFGs.

A new type of microhole-structured LPFG in SMF is fabricated by direct femtosecond laser pulse irradiation. The centers of the microholes are arranged to be situated approximately 6 μm away from the central fiber axis, and the hole diameter is approximately 6.5 μm. Such microholes can simultaneously affect the effective index of the fundamental core mode and that of the cladding mode and results in the formation of the LPFG. When compared with the conventional LPFG in SMF, the microhole based LPFG exhibit a large RI modulation and thus the number of grating periods required to produce appropriate depth of the resonance dip can be greatly reduced, which effectively reduces the grating length. Moreover, the microhole-structured LPFG exhibits relatively high RI sensitivity, due to the direct interaction of the surrounding medium with both the fundamental core mode and the cladding mode.

The microhole-structured LPFGs can be used for temperature sensing, especially for high temperature sensing. Conventional LPFG is produced by periodically varying the refractive index of fiber core or cladding. Although such a refractive index variation is usually referred to as a permanent refractive index modulation in the fiber core or cladding, the grating structure will not be stable and the refractive index modulation can be bleached and even completely erased when expose to high temperature environment, such as 1000° C.

On the contrary, the present microhole-structured LPFG introduces a periodical physical structural change along the fiber axis, such a structure change is permanent and hence exhibits excellent high temperature sustainability up to 1100° C. or higher.

Photonic Bandgap Fiber

Figure 4A:
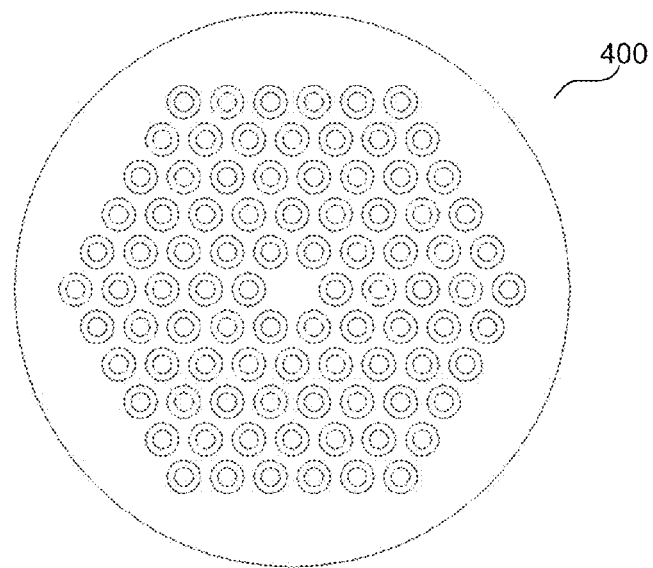
FIG. 4A illustrates a cross-sectional view of a conventional microstructured fiber prior to fabrication of microholes.
Figure 4B:
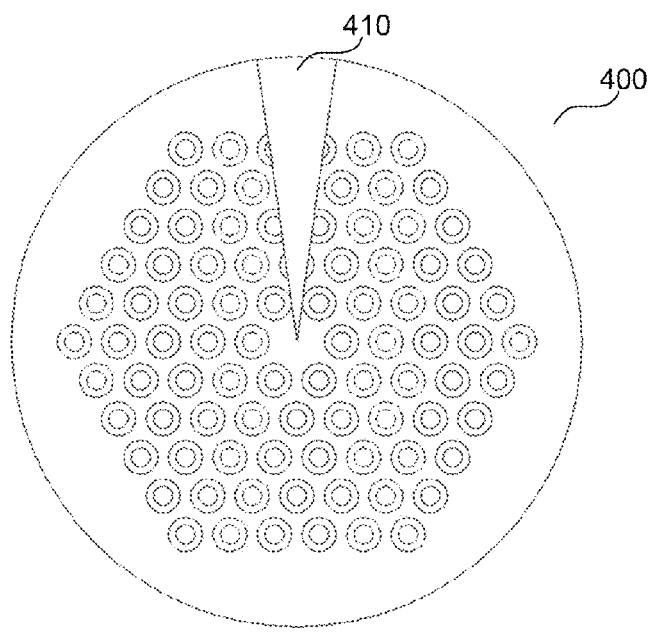
FIG. 4B illustrates a microhole-structured LPFG fiber of FIG. 4A in accordance with one embodiment of the present invention.

The present invention is not limited to any type of fiber, for example, the optical fiber may be a micro-structured fiber. FIG. 4A illustrates a cross-sectional view of a conventional microstructured fiber 400 prior to fabrication of microholes. Microstructured fiber 400 includes a core region and a cladding region. FIG. 4B illustrates a microhole-structured LPFG fiber of FIG. 4A in accordance with one embodiment of the present invention.

According to an embodiment of the present invention, femtosecond laser pulses (generated from spectraphysics spitfire Ti: sapphire with the central wavelength of 800 nm, the pulse duration time of 120 fs and the repetition rate of 1 kHz) are focused onto the PBGF cladding surface through a 20× objective lens (with an NA value of 0.5, energy coupling efficiency of 0.8 and a working distance of 2.1 mm). The pulse energy is set as 6.3 µJ and kept constant during the fabrication. In this embodiment, the PBGF has 5 layers of high RI rods with a period of 9.6 µm. A fluorine doped buffering loop (with the diameter of 7.3 µm and a smaller RI than that of the pure silica cladding) lies around each rod. The refractive indices (at 1550 nm) of the high RI rod, the buffering loop and the cladding are 1.4807, 1.4356, and 1.444, respectively. The nominal ratio of the diameter of the high RI rod to the rod period is d/Λ=0.43. In this exemplary embodiment, PBGF is mounted on a three dimensional translation stage controlled by a computer, with a tuning resolution of 40 nm. The pulse energy and exposure time of about 40 s are chosen to fabricate microholes with depth close to the PBGF radius. After laser pulse irradiation, part of the fiber material is removed and a cone shape microhole 410 is created. The scale of the microhole is about 62 µm in depth with a cone angle of 5 degree (this corresponds to 11 µm in width at the cladding surface). By drilling micro-holes periodically, a structural modulated LPFG device can be fabricated.

Figure 8:
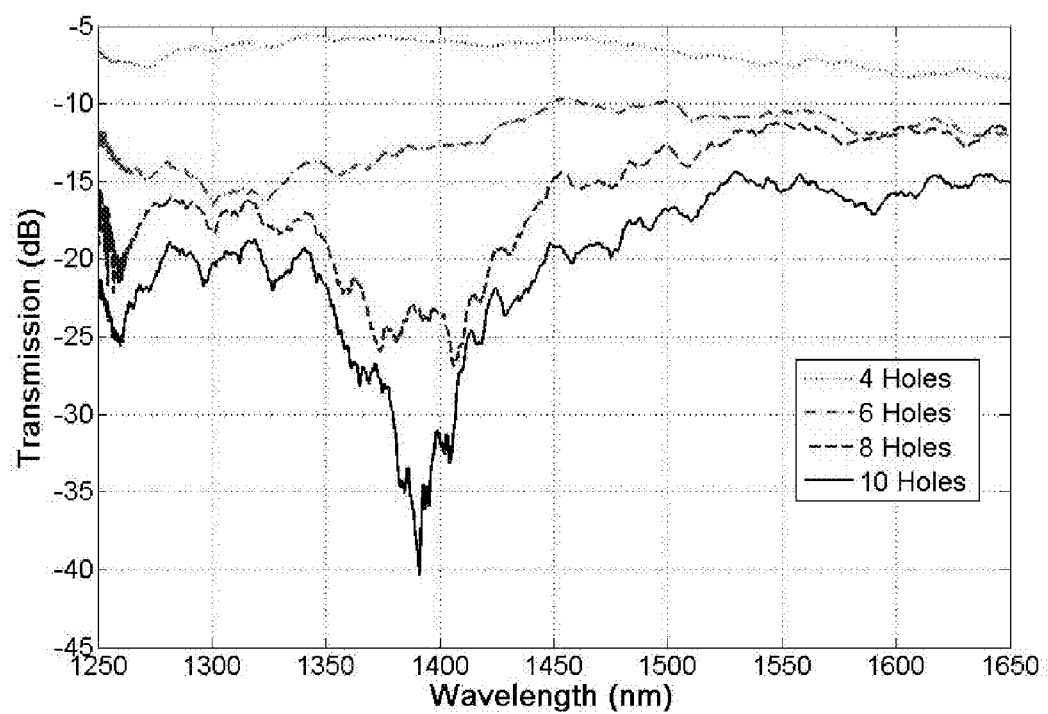
FIG. 8 is a graph illustrating transmission per wavelength for various number of fiber grating periods of the microhole-structured LPFG in microstructured fiber in connection with FIG. 4B.

The transmission spectrum of the LPFG can be measured by use of an OSA with a resolution of 0.5 nm. FIG. 8 is a graph illustrating transmission per wavelength for various number of fiber grating periods of the microhole-structured LPFG in photonic bandgap fiber (a type of microstructured fiber) in connection with FIG. 4B, with a grating period of 610 µm. The resonant wavelength of the device is located at 1390.9 nm. The insertion loss is 14.40 dB and the resonant depth is 25.96 dB (which is defined as the difference between the transmission loss at the resonant wavelength and the insertion loss). Due to fewer fiber gratings (microholes), the total length of the microhole-structured LPFGs fabricated by femtosecond laser micromachining is much smaller than that of the conventional LPFG device (with a dimension of several centimeters). Furthermore, according to the grating theory (where the transmission loss T can be determined by the coupling factor κ and the grating length L from the relationship $T=\cos^2(\kappa L)$) the structural modulated LPFG possesses a much stronger RI modulation than LPFG fabricated in conventional LPFG device.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An optical fiber with long period fiber grating, comprising:
   an optical fiber axis;
   a core region extending along the fiber axis, the core region having a core refractive index;
   a cladding region surrounding the core region, the cladding having a cladding refractive index; and
   a grating comprising:
      a plurality of microholes perpendicular to the fiber axis with a portion of the core region removed, exposing the core region to surrounding environment, and the plurality of microholes are spaced apart by a grating period.

2. The optical fiber with long period fiber grating according to claim 1, wherein each microhole extends through the core region.

3. The optical fiber with long period fiber grating according to claim 1, wherein each microhole does not extends through the core region.

4. The optical fiber with long period fiber grating according to claim 1, wherein the optical fiber is a single mode fiber.

5. The optical fiber with long period fiber grating according to claim 1, wherein the optical fiber with long period gratings is used to sense refractive index or temperature.

6. The optical fiber with long period fiber grating according to claim 1, wherein the plurality of microholes are fabricated by ultra-short pulse irradiation.

7. The optical fiber with long period fiber grating according to claim 6, wherein the ultra-short pulse irradiation includes femtosecond pulse irradiation.

8. The optical fiber with long period fiber grating according to claim 1, wherein the plurality of microholes are less than or equal to 15.

9. A method of fabricating an optical fiber with long period fiber grating, the method comprising:
   securing an optical fiber, the optical fiber comprising: a core region extending along a fiber axis of the optical fiber, the core region having a core refractive index, and a cladding region surrounding the core region, the cladding having a cladding refractive index; and
   forming a grating by drilling a plurality of microholes perpendicular to the fiber axis with a portion of the core region removed, exposing the core region to surrounding environment, and the plurality of microholes are spaced apart by a grating period.

10. The method according to claim 9, wherein the drilling is performed by ultra-short pulse irradiation.

11. The method according to claim 10, wherein the ultra-short pulse irradiation includes femtosecond pulse irradiation.

12. The method according to claim 9, wherein the optical fiber is a single mode fiber.

13. The method according to claim 9, wherein each drilled microhole extends through the core region.

14. The method according to claim 9, wherein each drilled microhole does not extends through the core region.

15. The method according to claim 9, wherein the plurality of microholes are less than or equal to 15.

16. The optical fiber with long period fiber grating according to claim 1, wherein the optical fiber is a microstructured fiber.

17. The method according to claim 9, wherein the optical fiber is a microstructured fiber.

* * * * *